United States Patent [19]

Cash

[11] 3,828,326

[45] Aug. 6, 1974

[54] ADAPTER FOR INTERFACING A PROGRAMMABLE CONTROLLER TO A DATA PROCESSOR CHANNEL

[75] Inventor: Kenneth W. Cash, Rochester, Minn.

[73] Assignee: International Business Machines Corporation, Armonk, N.Y.

[22] Filed: Apr. 18, 1973

[21] Appl. No.: 352,376

[52] U.S. Cl. .................. 340/172.5

[51] Int. Cl. .................. G06f 3/00

[58] Field of Search .................. 340/172.5

[56] References Cited

UNITED STATES PATENTS 3,573,741 4/1971 Gavril .................. 340/172.5

3,728,693 4/1973 Macker et al. .................. 340/172.5

*Primary Examiner*—Paul J. Henon
*Assistant Examiner*—Melvin B. Chapnick
*Attorney, Agent, or Firm*—J. Michael Anglin

[57] ABSTRACT

An adapter interfaces a computer channel to a single controller normally capable of both controlling a device and meeting the channel response requirements. The adapter detects times when the controller cannot communicate with the channel, inhibits this function of the controller, and itself carries out an altered channel communication procedure in simple logic circuits.

9 Claims, 3 Drawing Figures

ADAPTER FOR INTERFACING A PROGRAMMABLE CONTROLLER TO A DATA PROCESSOR CHANNEL

BACKGROUND OF THE INVENTION

The present invention relates to the art of electrical communications, and specifically concerns the interconnection of automatic data processors and peripheral devices therefor.

The continually declining prices of small programmable data processors makes them attractive for many applications in which hard-wired digital logic circuits had previously been used, and also allows the implementation of additional functions which would have been economically unfeasible in hard-wired circuits. Conversely, these new applications have led to organizational changes in such processors to facilitate the direct sensing and controlling of physical phenomena. This trend has already proceeded to the point where such processors, more accurately called programmable controllers, are considered to be black-box components of larger systems.

One of the major applications of digital controllers is to control peripheral devices attached to a host data processor or computer. Two types of control are required in this application. The first type involves controlling the device by sensing machine conditions, actuating relays, motors, and so forth. The second type concerns the handling of communications between the device and the computer. When a device is attached to a channel of a large-scale data processor such as the IBM System/360 or System/370, it must provide sequences of properly timed signals on a number of separate lines whenever it is interrogated or selected. If these requirements are not met, the channel senses a fault which may cause the whole system to crash. That is, the entire operation halts until it can be manually restarted.

In contrast to parallel, hard-wired logic, a programmable controller is a sequential unit. It can perform only one operation at a time. Thus, although a single controller may have sufficient internal facilities for handling both device control and channel communications, it may sometimes be forced to reply to channel signals when it is engaged in a lengthy device-control operation. If the latter is interrupted, the device may run wild or lose data irretrievably. On the other hand, the controller may be engaged in an uninterruptible channel routine when the device demands immediate attention.

There are two conventional solutions to this problem. One is to add enough hard-wired logic to the controller to perform one of the functions and to use the controller only for the other function. But, since both control and communication are relatively complex, this is often economically wasteful to the point where it defeats the purpose of using a programmable controller in the first place. The other conventional solution would be to employ multiple controllers, one being dedicated to the communication function while one or more separate controllers are dedicated to device control. The latter solution has in fact been used, as shown, for example, in U.S. Pat. No. 3,654,617. It becomes economically feasible, however, only where the incremental cost of adding another controller is a relatively small part of the total machine cost. This may be the case for devices which are inherently expensive anyway, or where multiple devices can be clustered into a single entity for purposes of communicating with a channel.

Neither of the above solutions is feasible for an individual peripheral device in which the controller represents a significant portion of the cost of the unit. Yet, since the controller is capable of handling both the control and the communication functions most of the time, a reversion to separate hard-wired logic for both functions would be considerably more expensive than the use of a controller. But, at the heretofore existing state of the art, it appeared that a single programmable controller simply could not assure a timely response to the requirements of both the controlled device and the data-processor channel.

SUMMARY OF THE INVENTION

The present invention advances the current state of the art by providing an adapter for interfacing a data-processor channel having fixed response-time requirements to a single programmable controller which is normally capable of both controlling a peripheral device and processing channel signals, but which may temporarily enter an uninterruptible sequence while controlling the device, at which times it becomes unable to satisfy the channel requirements. Under normal conditions, the adapter produces an interrupt signal from the outbound channel signals to cause the controller to respond according to a normal communication procedure.

When the controller starts an uninterruptible control sequence, it produces a busy signal. The adapter then inhibits any interrupt signal which may occur, and produces a set of inbound channel signals according to an altered and previously undefined procedure, which is nevertheless sufficient to satisfy the timing requirements. The busy signal may be produced by an instruction placed at the beginning of the uninterruptible sequence to set a register bit, and by another instruction at the end to turn it off again.

Thus, the present adapter effectively "short circuits" the outbound and inbound channel signals, and disconnects them from the controller, when the controller cannot respond. This function is accomplished with a very small amount of logic circuitry; its cost is insignificant in comparison to the cost of the controller. The invention therefore makes practical the use of a programmable controller for handling relatively inexpensive individual peripheral devices.

These and other objects and advantages of the invention, as well as modifications obvious to those skilled in the art, will appear from the following detailed description of a preferred embodiment thereof, taken in conjunction with the accompanying drawings.

DESCRIPTION OF THE EMBODIMENT

Figure 1:
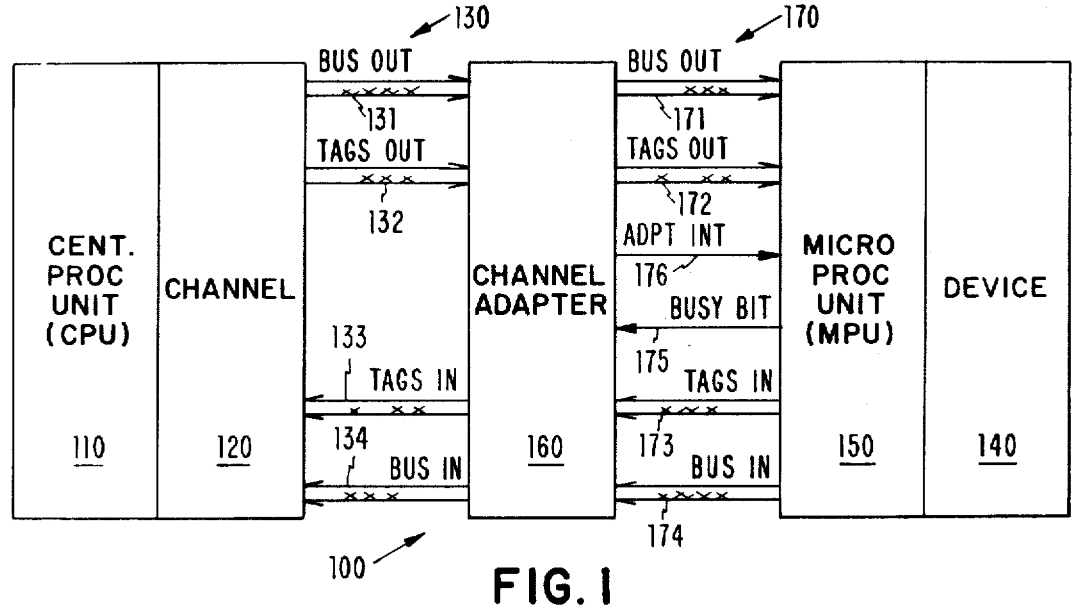
FIG. 1 is a simplified schematic of a data-processing system including the invention.

In the data-processing system 100 of FIG. 1, central processing unit (CPU) 110 may be coupled to a number of peripheral devices through channel facilities 120. Channel 120 communicates with the devices by means of signals 130. A preferred example of such signals is shown in "IBM System/360 and System/370 I/O Interface Channel to Control Unit Original Equipment Manufacturers' Information," IBM Systems Reference Library Form No. GA22–6974–1 (Second Edition, July 1972), incorporated herein by reference and termed "OEMI Manual" for brevity. The channel signals are divided into four basic groups. Bus Out 131 carries eight data bits (plus a parity bit) outbound from channel 120 to the peripheral or I/O devices. The Tags Out lines 132 transmit tag bits outbound from the channel for control purposes. The Tags In lines 133 carry control bits from the peripheral devices inbound to channel 120. Bus In 134 carries eight data bits (plus a parity bit) inbound to the channel. For the sake of consistency, all signals emanating from channel 120 will include the designation "Out," while all signals transmitted from a peripheral device to the channel will be designated "In." Signals on tag lines 132 and 133 are named and defined in the aforementioned OEMI Manual. Thus "Operational In," for instance, refers to a specific tag signal in one of the inbound lines 133.

Of the various types of I/O units which may be used in system 100, the present invention is concerned with a device 140 which is controlled by means of a programmable controller or micro-processing unit 150. A specific example of such a device is described in, for example, "IBM 3881 Optical Mark Reader Models 1 and 2 Reference Manual and Operator's Guide," IBM Systems Reference Library Form No. GA21–9143–0 (first edition, December 1972). Various aspects of this unit are also described in commonly assigned U.S. Pat. Application Ser. No. 250,266 (filed May 4, 1972, by K. W. Cash et al.) now U.S. Pat. No. 3,763,467, incorporated herein by reference.

MPU 150 communicates with channel 120 through a channel adapter 160 which is coupled both to lines 130 and to signal lines 170. Referring specifically to FIG. 6 of U.S. Pat. Application Ser. No. 250,266 now U.S. Pat. No. 3,763,467, Bus Out lines 171 may carry data bits into D Register 202 for processing within MPU 150. Certain Tags Out lines 172 may present control bits to the "Test Conditions" inputs of BOC testing means 203, allowing MPU 150 to take appropriate action in response to outbound control signals on lines 132. Tag lines 173 carry signals indicating control information produced by MPU 150 to be transmitted into lines 133, while Bus In lines 174 transmit data bits from the MPU to channel 120 via lines 134. Both sets of lines 173 and 174 may originate in Output Register 210 of the MPU.

Adapter 160 as thus far described performs a number of conventional functions for coupling the signals from lines 131–134 to lines 171–174, respectively. Signal levels may be transformed, waveforms shaped, certain logic may be executed to combine or generate different signals, and so forth. But adapter 160 performs another function as well.

Since MPU 150 controls device 140 by sequential operations rather than by hardwired logic operating in parallel for all operations, it may find itself in the midst of a control operation when channel 120 demands a response within a fixed period of time. If this operation is interrupted to satisfy the channel requirements, device 140 may run wild, or data may be lost. But, if the channel signals are disregarded, the entire system 100 and all its peripheral devices will be disrupted until the cause of the "error" has been manually found. Therefore, adapter 160 also contains logic circuits for sensing a signal on line 175 indicating that MPU 150 cannot be interrupted. Line 175 then inhibits the signals on line 176 from reaching the MPU, while a small amount of hardware in the adapter satisfies the channel requirements by making a new type of response on lines 133 and 134.

Figure 2:
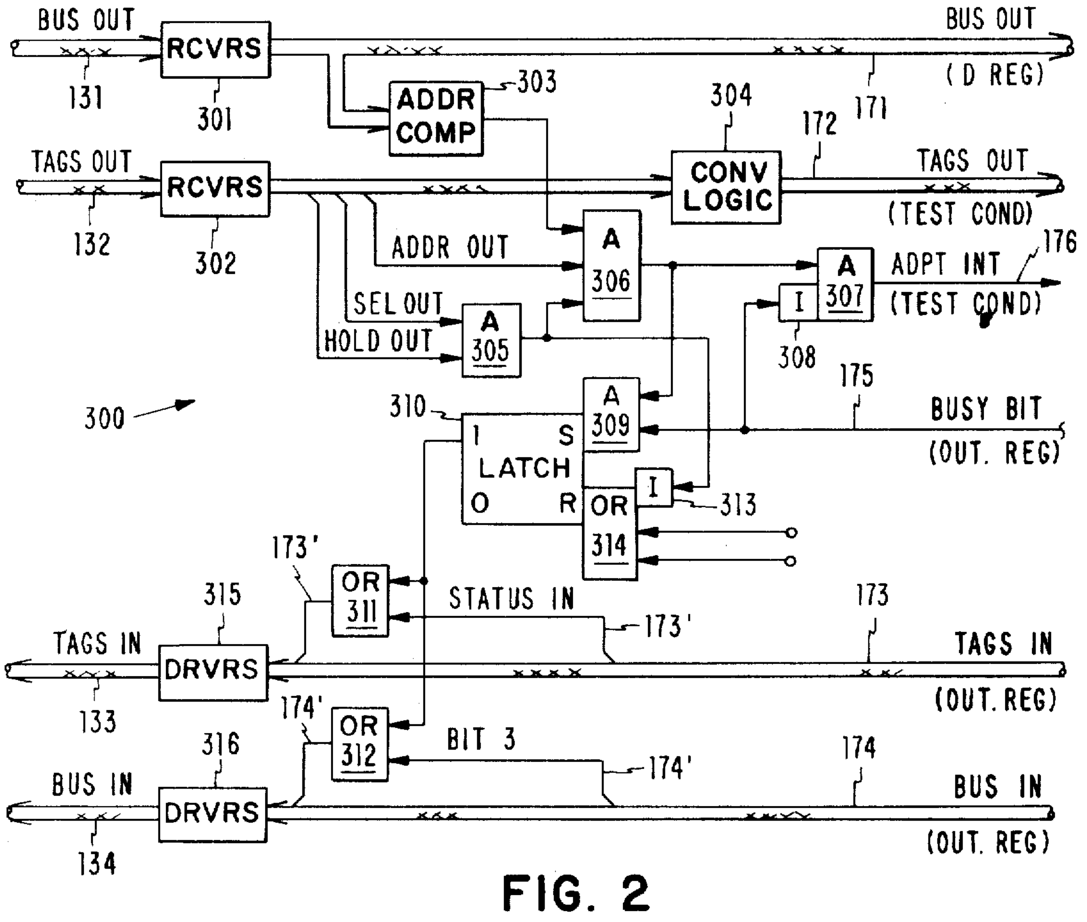
FIG. 2 shows that portion of a channel adapter according to the invention.

Turning now to FIG. 2, circuit 300 details the portion of adapter 160 which is involved in the above functions.

Conventional receiver circuits 301 and 302 provide conversion facilities for matching the signals on lines 131 and 132 to the requirements of lines 171 and 172, respectively. Address comparator 303 produces an identifying signal when the bits on lines 171 match a preselected address value arbitrarily assigned to device 140. Conversion logic 304 combines certain ones of the tag signals, so that lines 172 carry a set of hybrid tags, partly the same as tags 132 and partly combinations thereof. The particular significance of these tags is irrelevant to the present invention.

When channel 120 wishes to communicate with MPU 150, it sends the address of device 140 on Bus Out 131 and raises three tags, Address Out, Select Out, and Hold Out, on Tags Out 132. If MPU can be interrupted at that time, AND gates 305, 306 and 307 produce an "Adapter Interrupt" tag on line 176. If, for example, tag line 176 is equated to a label ADPSEL, then a single branch-on-condition instruction "BOC ADPSEL, GOIDLEI" causes MPU 150 to branch to a conventional program routine, accessible from GOIDLEI, for reading the signals on lines 171 and 172 and producing the normal response signals on lines 173 and 174. But, if a busy bit on line 175 indicates that MPU 150 cannot be interrupted, inverter 308 prevents AND 307 from activating line 176. The busy bit is turned on by setting a register in MPU 150 before it enters an uninterruptible sequence of instructions; it is turned off at the end of the sequence by resetting the register. A simple example of program instructions for such a procedure might be:

TABLE I

1. ORI ATIMAGE, CUBUSY
2. XFR ATIMAGE, ATI
   (Uninterruptible Instruction Sequence)
3. AND ATIMAGE, ONES-METER-CUBUSY
4. XFR ATIMAGE, ATI
5. BU STATGEN where instruction (1) OR's the busy bit CUBUSY into storage location ATIMAGE, and instruction (2) transfers the contents of this location to a hardware register named ATI. One bit of this register is coupled to line 175, so that the following instruction sequence will not be broken by any signals on lines 130. The busy bit is reset after the sequence by ANDing the contents of ATIMAGE with a bit configuration ONES-METER-BUSY, in which the busy-bit location contains a zero. Instruction (4) then again transfers the contents of ATIMAGE to register ATI.

It now remains to provide an acceptable response to channel 120 when MPU 150 is thus prevented from issuing the usual full response sequence. To this end, AND 306 and line 175 enable AND 309 to set latch 310. This latch in turn activates the Status In line 173' of Tags In lines 173 through OR 311. It also activates only the third bit 174' of Bus In lines 174, via OR 312. The use of OR gates 311 and 312 allows these two lines to be used in the normal way for signals on lines 173 and 174 originating in MPU 150, without interference from circuit 300.

Line 175 cannot be used directly to set lines 173' and 174' whenever the busy bit is on, since these lines are also used by other peripheral units attached to channel 120. That is, they must be set only at the proper time during a selection sequence addressed to adapter 160. Therefore, the deactivation of either the Select Out or Hold Out lines disables AND 305 and resets latch 310 through inverter 313 and OR gate 314. The remaining inputs to OR 314 allow other signals not pertinent to the invention to act as overriding or system resets for latch 310.

Finally, conventional drivers 315 and 316 convert the signals on lines 173 and 174 to a form suitable for transmission to channel 120 over lines 133 and 134.

Figure 3:
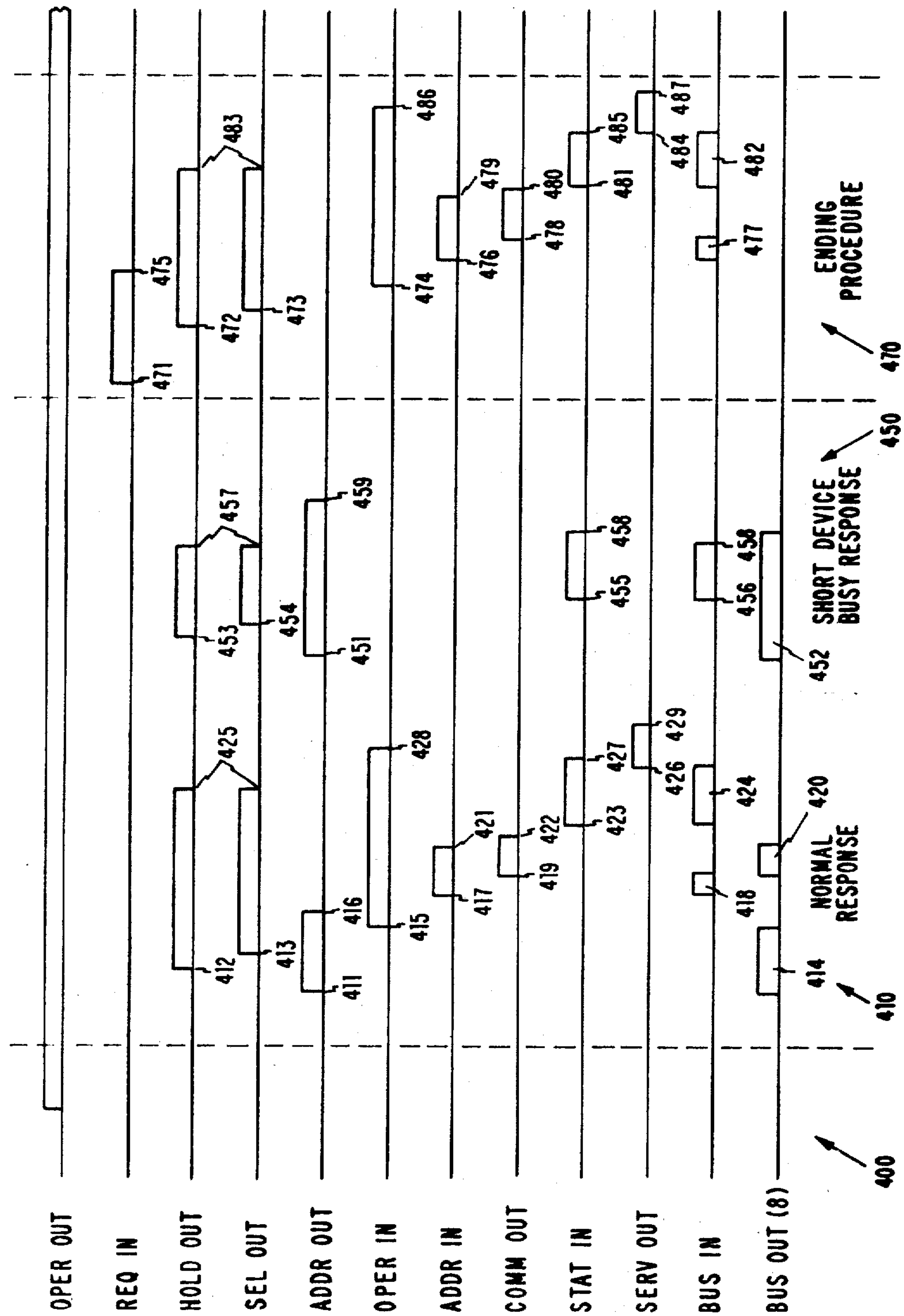
FIG. 3 is a timing diagram showing channel signals used in the invention.

FIG. 3 shows waveforms 400 for a normal response 410 produced by MPU 150, a modified response 450 from circuit 300 and an ending procedure 470 initiated by the MPU.

Normal response 410 is taken from the diagram on page 49 of the aforementioned OEMI Manual. When channel 120 raises Address Out at 411, Hold Out at 412 and Select Out at 413, and when the address 414 of device 140 appears on the eight data lines of Bus Out, MPU 150 responds by raising Operational In at 415. Address Out then drops at 416, and Address In at 417 (along with the correct device address on Bus In at 418) causes the channel to raise Command Out at 419 and to issue a particular control command on Bus Out at 420. Address In and Command Out then fall at 421 and 422. Then, when Status In is raised at 423, certain status information, such as a "channel end" condition, may be sent on Bus In at 424. After verifying that Status In is up, the channel drops Hold Out and Select Out at 425, and meanwhile raises Service Out at 426. MPU 150 drops Status In at 427 and, after verifying that Hold Out is down, drops Operational In at 428. Service Out drops at 429, and the sequence is completed by verifying that Operational In has dropped. This normal response is also made when a device is busy if MPU 150 can be interrupted at the proper time; the busy status is indicated by a predetermined bit configuration on Bus In at 424.

The short device busy sequence 450 also begins with the raising of Address Out, at 451, and the presentation of eight address bits on Bus Out, at 452. This time, the raising of Hold Out and Select Out, 453 and 454, does not reach MPU 150 for a normal response. Instead, adapter 160 immediately raises Status In at 455 and raises only bit 3 of Bus In at 456. Then, when Hold Out and Select Out drop at 457, bit 3 of Bus In and Status In drop together at 458. Channel 120 then drops Address Out at 459, completing the sequence.

Superficially, the short device busy sequence appears similar to a control-unit busy procedure shown on page 49 of the OEMI Manual. The latter procedure, however, requires the activation of Bus In bit 1 along with Bus In bit 3, as described on page 21 of the Manual. The use of bit 3 alone is not defined for the System/360 or System/370 channels, and persons intimately familiar with the design and employment of these channels had heretofore believed that such use was not possible. But it has been found that the above-defined short device busy procedure can in fact be handled by the channel, without any channel programming changes whatsoever, if the peripheral unit later initiates a conventional device-end sequence to channel 120, just as it would have done had it first responded with a normal busy procedure according to the format of 410.

A device-end procedure 470 may also be found on page 49 of the OEMI manual. It begins at 471 when MPU 150 raises Request In on lines 173. Channel 120 then raises Hold Out at 472 and Select Out at 473. The MPU responds by raising Operational In at 474 and dropping Request In at time 475. Address In at 476 is accompanied by the specific address 477 of device 140 on the eight Bus In lines, until the channel activates Command Out at 478. Then, after Address In and Command Out have dropped at 479 and 480, the MPU raises Status In at 481 and presents a device-end status (bit 5 only) on Bus In at 482. The channel drops Hold Out and Select Out at 483 and raises Service Out at 484, whereupon the MPU drops Status In at 485. The MPU then verifies that Hold Out has been deactivated and drops Operational In at 486. The channel completes the sequence by dropping Service Out at 487.

The purpose of ending procedure 470 is to indicate to channel 120 that MPU 150 is no longer busy. If channel 120 had attempted communication with MPU 150 and received a busy response, the channel will use a procedure such as 410 to retry its communication. No communication had been attempted, the channel will not respond to procedure 470. Referring again to Table I, the resetting of the busy bit by instruction (4) is followed by instruction (5) in MPU 150. The latter instruction causes an unconditional branch to a routine called STATGEN, which initiates procedure 470. When the required sequence has been completed, a return is taken to the mainline instruction immediately following instruction (5).

Various modifications within the spirit and scope of the invention will be apparent to those skilled in the art. Therefore, having described a preferred embodiment, I claim as my invention:

1. An adapter for interfacing a single programmable controller to a channel of a data processor, said single controller being operative both to control a peripheral device and to communicate with said channel, said adapter comprising:

receiver means for accepting outbound signals from said channel;

driver means for transmitting inbound signals from said adapter and from said controller to said channel;

interrupt means responsive to a predetermined combination of said outbound signals indicating that said channel has addressed said device, said interrupt means producing an interrupt signal enabling said controller to produce a plurality of said inbound signals according to one of a number of different procedures, one of said procedures being a first procedure indicating that said device is busy;

inhibiting means for disabling said interrupt means in responsive to a busy bit from said controller, said busy bit indicating that said controller is temporarily unable to produce said inbound signals according to said first procedure; and logic means responsive both to said busy bit and to said combination of outbound signals indicating that said channel has addressed said device, for producing a second plurality of said inbound signals according to a second predetermined procedure, said second procedure indicating that said device is busy, but being different from said first procedure.

2. The adapter of claim 1, wherein said interrupt means includes comparator means for producing an identifying signal in response to predetermined Bus Out signals indicating that said device has been addressed, and gating means responsive to said identifying signal and to an Address Out signal, said Bus Out and Address Out signals being included in said predetermined combination of outbound signals; and wherein said logic means includes a latch means responsive to the simultaneous presence of said identifying signal, said Address Out signal, and said busy bit for producing said second plurality of inbound signals.

3. The adapter of claim 2, wherein said latch means is further responsive to the simultaneous presence of Select Out and Hold Out signals which are further included in said predetermined outbound signals.

4. The adapter of claim 3, wherein said latch means is disabled by the absence of at least one of said Select Out and Hold Out signals.

5. The adapter of claim 2, wherein said inbound signals comprise a bus group and a tag group for controlling the interpretation of said bus group by said channel, said latch means being operative to produce at least one signal in each said group.

6. The adapter of claim 5, wherein said latch means produces a Bus In signal in said bus group and a Status In signal in said tag group.

7. The adapter of claim 5, wherein said bus group carries eight data bits labelled 0–7, and wherein said latch means is operative to produce a signal only on bit 3 of said bus group.

8. A method of interfacing a data-processor channel having fixed response-time requirements to a single programmable controller which is normally capable of both controlling a peripheral device and processing channel signals for communicating with said channel, but which may temporarily enter an uninterruptible instruction sequence while controlling said device, so as to become unable to satisfy said requirements, said method comprising the steps of:

producing from said channel signals an interrupt signal for enabling said controller to communicate with said channel according to a normal procedure;

executing an instruction in said controller prior to said uninterruptible sequence for producing a continuous busy signal during said sequence;

inhibiting said interrupt signal in response to said busy signal;

communicating with said channel according to an altered procedure by producing predetermined ones of said channel signals in logic circuits outside said controller in response to said busy signal; and executing an instruction subsequent to said uninterruptible sequence for disabling said busy signal.

9. The method of claim 8, including the step of executing a further instruction subsequent to said uninterruptible sequence, said further instruction being operative to initiate an ending procedure to said channel.

* * * * *